United States Patent [19]

Osterberg et al.

[11] Patent Number: 5,775,472

[45] Date of Patent: Jul. 7, 1998

[54] MULTI-AXIS TUNED MASS DAMPER

[75] Inventors: David A. Osterberg, Glendale;
Lawrence P. Davis, Phoenix, both of Ariz.

[73] Assignee: Honeywell Inc.

[21] Appl. No.: 754,487

[22] Filed: Nov. 22, 1996

Related U.S. Application Data

[63] Continuation-in-part of Ser. No. 495,156, Jun. 27, 1995, abandoned.

[51] Int. Cl.⁶ ........................................ F16F 7/10
[52] U.S. Cl. .......................... 188/378; 188/379; 188/380; 267/136; 267/122; 267/221; 267/226
[58] Field of Search .................. 188/378–380, 188/298, 322.13, 275, 280; 267/136, 140.11, 122, 221, 226, 140.5; 248/583, 603, 559, 589, 631, 581, 605, 606, 565, 550, 566; 244/17.27, 17.11; 416/500; 52/167.6, 167.1, 167.2; 92/37–39

[56] References Cited

U.S. PATENT DOCUMENTS

| | | | |
|---|---|---|---|
| 3,101,937 | 8/1963 | Stearns | 267/122 |
| 3,213,764 | 10/1965 | Nelson et al. | 92/39 |
| 3,603,610 | 9/1971 | Thompson | 267/221 |
| 4,213,518 | 7/1980 | Hardenberg et al. | 188/378 |
| 4,760,996 | 8/1988 | Davis | 188/276 |
| 4,807,840 | 2/1989 | Baker et al. | 248/559 |
| 4,862,697 | 9/1989 | Tugal et al. | 188/378 |
| 5,052,529 | 10/1991 | Sutcliffe et al. | 188/380 |
| 5,219,051 | 6/1993 | Davis | 188/298 |
| 5,558,191 | 9/1996 | Lai | 188/379 |
| 5,564,536 | 10/1996 | Lai | 188/379 |

FOREIGN PATENT DOCUMENTS

| | | | |
|---|---|---|---|
| 1472722 | 4/1989 | U.S.S.R. | 267/136 |
| 0791342 | 2/1958 | United Kingdom | 188/379 |

*Primary Examiner*—Douglas C. Butler
*Attorney, Agent, or Firm*—Charles J. Ungemach

[57] ABSTRACT

A tuned mass damper using a single predetermined mass connected to springs of predetermined stiffness along each of at least two directions to absorb energy from a vibrating structure to which it is attached and damp the vibrations in a rapid and efficient manner with a minimum of weight and volume used.

18 Claims, 1 Drawing Sheet

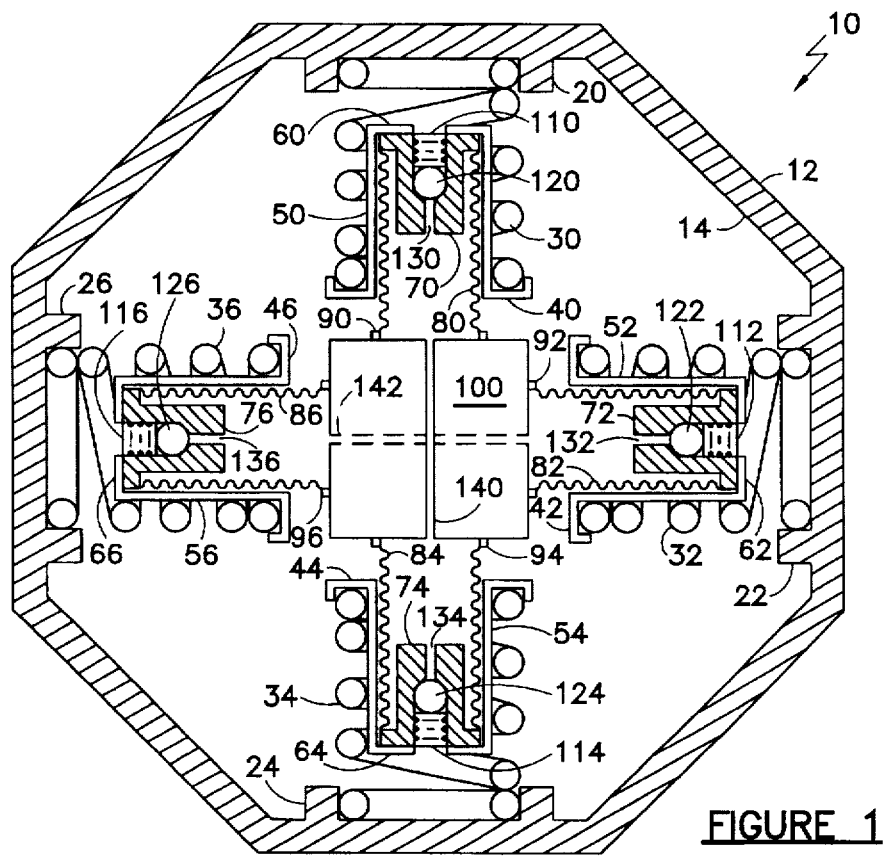
FIGURE 1
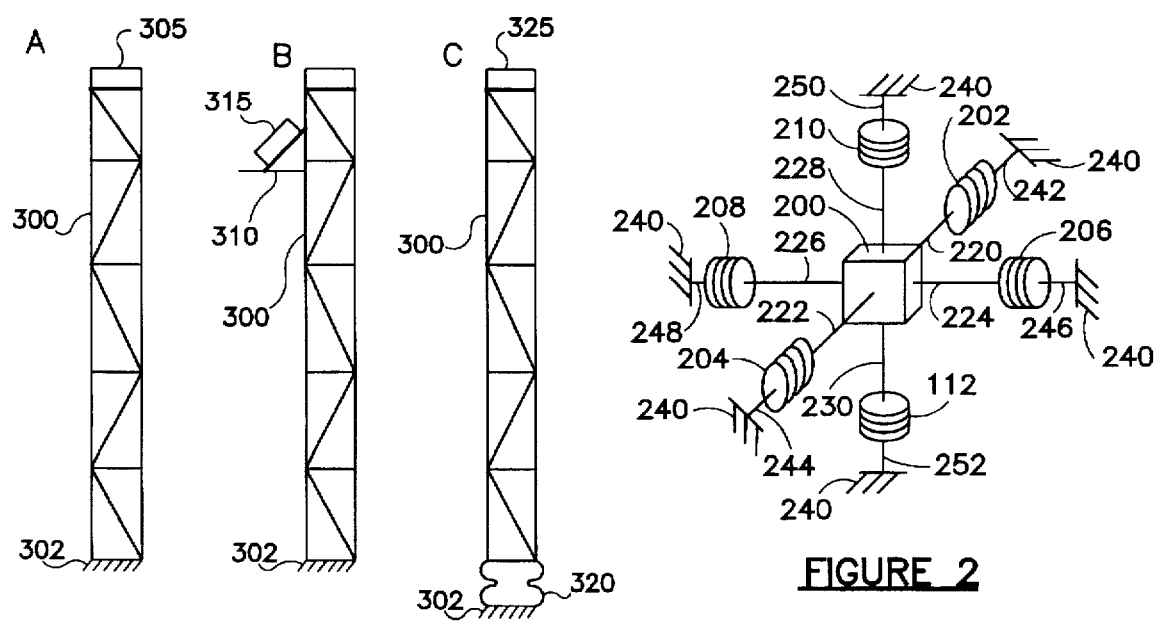
FIGURE 3
FIGURE 2

5,775,472

MULTI-AXIS TUNED MASS DAMPER

This application is a continuation-in-part of application Ser. No. 08/495,156 filed Jun. 27, 1995, now abandoned.

BACKGROUND OF THE INVENTION

1. Field of the Invention

The present invention relates to dampers and particularly to tuned mass dampers for damping oscillations or vibrations which may occur in certain structures that may begin oscillating due to a shock input. Reference may be had to a copending application entitled "Tuned Mass Damper with Tunable Damping and Anti-Friction Rolling Mass" by Toren S. Davis and David A. Osterberg filed Jan. 25, 1996, Ser. No. 08/591,922 and assigned to the assignee of the present invention which application describes and claims a tuned mass damper for damping undesirable oscillations in structures such as booms.

2. Description of the Prior Art

In many applications it is desirable to remove vibration from structures which oscillate when subjected to shock or other type of vibratory excitations. One such application occurs with booms that may be used to hold sensing equipment on satellites and where thermal shocks or snaps may cause the boom to vibrate at a predetermined frequency. Such oscillations can cause inaccuracies in the sensing equipment and accordingly it is desirable to damp the vibrations out as quickly as possible. Prior art tuned mass dampers employ a spring positioned mass mounted in a container of fluid or a viscoelastic material is used instead of fluid. The spring stiffness and the mass are chosen to have the same frequency of oscillation as the boom and damper device combination so that upon oscillation, the vibrating boom provides an input to the damper, and the mass vibrates 180 degrees out of phase with the boom. The damper absorbs a substantial portion of the energy of the boom and cancels the boom motion at that frequency so that the tuned damper and boom begin to vibrate at two slightly different off-resonant frequencies. The boom displacement is then much smaller and can be more quickly and effectively damped out by the fluid or the viscoelastic material. One problem which is encountered in prior art dampers arises when it is desired to damp vibrations in two or three axes. Prior art dampers require that a separate damper be used for each axis. This multiplies the mass/spring/fluid combinations and adds greatly to the volume and the weight of the system. This is particularly undesirable in space applications where volume and weight considerations are critical.

BRIEF DESCRIPTION OF THE PRESENT INVENTION

The present invention overcomes the problem of the prior art by our discovery that a single mass may be mounted for motion in two or three axes and be supported by springs chosen to provide a frequency of vibration in each axis which matches the frequency of vibration of the boom in such axis with little or no effect on the vibrations in the other axes. Because the system is relatively linear in each axis, the performance and motion in each axis is independent and the principal of superposition can be used to predict performance in each axis. Also, by using a unique spring mounting arrangement, the stiffness of the spring forces on the weight can be made quite soft thus providing much lower vibration frequencies than stiffer systems can handle.

BRIEF DESCRIPTION OF THE DRAWINGS

FIG. 1 shows a schematic diagram of a two axis embodiment of the present invention;

FIG. 2 shows a simplified pictorial representation of a three axis embodiment of the present invention; and, FIGS. 3a, b and c show the tuned mass damper connected to a boom in three different configurations.

DETAILED DESCRIPTION OF THE PREFERRED EMBODIMENT

In FIG. 1, a two axis damper generally shown by reference numeral 10 is shown having an octagonal housing 12. Housing 12 may alternately have any convenient shape such as square. The interior wall 14 of housing 12 has a plurality of inwardly directed abutments 20, 22, 24 and 26 which may be circular in shape so as to form a holding base for one end each of a plurality of springs 30, 32, 34 and 36 respectively. Springs 30, 32, 34 and 36 extend inwardly and their other ends fit within generally circular extending lips 40, 42, 44 and 46 of cup shaped members 50, 52, 54 and 56 respectively. The circular shapes of the abutments 20, 22, 24 and 26 and the lips 40, 42, 44 and 46 are to conform to the shapes of the springs 30, 32, 34 and 36 but may be different shapes if desired as may the springs themselves.

Cup shaped members 50, 52, 54 and 56 extend outwardly and terminate with ends 60, 62, 64 and 66 located a predetermined distance from the interior wall 14. The interiors of cup shaped members 50, 52, 54 and 56 have damping fluid filling structures 70, 72, 74 and 76 respectively located therein with one end each of a plurality of bellows 80, 82, 84 and 86 fastened thereto and extending back inwardly of the housing 12. The other ends of bellows 80, 82, 84 and 86 terminate in circular or other appropriately shaped recesses 90, 92, 94 and 96 respectively formed in a centrally located mass 100 in the interior of housing 12.

A damping fluid may be inserted into the interior of bellows 80, 82, 84 and 86 through the fluid filling structures by threaded accesses 110, 112, 114 and 116 through the ends 60, 62, 64 and 66 of cup shaped members 50, 52, 54 and 56 and past ball valves 120, 122, 124 and 126 respectively and passages 130, 132, 134 and 136 respectively. Mass 100 also has a passage 140 therethrough to connect the interiors of bellows 80 and bellows 84 and a passage shown by dashed lines 142 therethrough to connect the interiors of bellows 82 and 86.

It should be noted that the stiffness of bellows 80, 82, 84 and 86 is normally relatively high because to soften the bellows spring effect, the walls of the bellows are made thinner and for very soft requirements, the walls cannot be made thin enough and still contain the pressure of the damping fluid therein. Accordingly, the springs 30, 32, 34 and 36 are uniquely mounted in series with the bellows 80, 82, 84 and 86 and are made sufficiently soft to allow mass 100 to move at low frequencies encountered in vibration of satellite booms. Also, damping is lowered by this arrangement. In other applications, where high frequency oscillations are encountered, springs 30, 32, 34 and 36 may not be necessary and the stiffness of bellows 80, 82, 84 and 86 extending between mass 100 and the housing 12 may be alone sufficient to support mass 100 for such high frequency oscillations. In very high frequency applications, the spring may be in parallel with the bellows both extending between the mass 100 and the housing 12.

It should also be noted that when mass 100 moves in the horizontal direction, the vertical bellows 80 and 84 are distorted to the left and right introducing further spring forces to the horizontal direction. These lateral forces must be taken into consideration in determining the stiffness of the springs but the lateral forces are also linear and for the large part are independent of the displacements in the orthogonal axes.

In operation, knowing the vertical frequency of vibration of the structure to which the damper is attached, mass 100 and springs 30 and 34 in combination with the stiffness of bellows 80 and 84 and the lateral stiffness of bellows 82 and 86 and springs 32 and 36 are chosen to provide the same vertical frequency. Similarly, knowing the horizontal frequency of vibration of the structure to which the damper is attached, mass 100 and springs 32 and 36 in combination with the stiffness of bellows 82 and 86 and the lateral stiffness of bellows 80 and 84 and springs 30 and 34 are chosen to provide the same horizontal frequency. Because of the cross effects of the lateral stiffness and because only one mass 100 is to be used, some experimentation with various stiffness of springs 30, 32, 34 and 36 may be required.

Next, the viscosity of the damping fluid is chosen and inserted through ball valves 120, 122, 124 and 126 to provide the desired damping characteristics in both directions. Here again, a certain amount of experimentation with various damping fluid viscosities may be required and the viscosity of the damping fluid in bellows 80 and 84 may not be the same as the viscosity of the damping fluid in bellows 82 and 86. It should be here noted, however, that while the two sets of bellows have not been shown to be independently connected, it is entirely possible that the independent passages 140 and 142 may be interconnected so that a single damping fluid can be used.

After the damper 10 has been tuned and mounted on the desired structure, such as a boom, vibrations of the boom in any direction will be countered by 180 degrees out of phase motion of the mass 100 thus extracting energy from the boom motion and causing the boom and damper to oscillate at two slightly different frequencies. Now since the damper has absorbed a substantial portion of the energy, the boom displacement is much smaller and is effectively damped out by the damping fluid.

The embodiment shown in FIG. 1 is for two axis operation which is normally encountered with a boom. In the event that three axis operation is desired, a third set of bellows/spring combination may be connected between the housing 12 and the mass 100 as is shown in simplified form in FIG. 2.

In FIG. 2, a mass 200 is shown having three sets of bellows 202/204, 206/208 and 210/212 connected thereto in three orthogonal directions by connections shown by reference numerals 220/222, 224/226, and 228/230 respectively. Bellows 202/204, 206/208 and 210/212 are also connected to the housing 240 with connections shown by reference numerals 242/244, 246/248 and 250/252 respectively. The cup shaped members, the soft springs, the filling valves and the orifices through mass 100 have been omitted in FIG. 2 for clarity.

The same operation as described in connection with FIG. 1 will apply to the structure of FIG. 2 although the choice of spring and bellows stiffness and the viscosity of the damping fluid will be more complex to determine.

FIG. 3 shows the tuned mass damper of the present invention mounted on a member in three different configurations. In FIG. 3a, a boom 300 is shown fixed to a member such as a space craft as shown by the cross hatched area 302. The boom 300 in this configuration may oscillate primarily in two directions (e.g. In the plane of the figure and perpendicular to the plane of the paper). Accordingly, a two axis tuned mass damper 305, such as shown in FIG. 1, may be mounted on the end of boom 300 to damp the vibration of boom 300 in the two directions.

In FIG. 3b, the boom 300 is mounted as in FIG. 3a but it may be desirable to mount the damper at an angle to the length of the boom. This is shown in FIG. 3b by a tilted mounting device 310 connected to boom 300 and mounting a damper 315. Since the tuned mass damper is not in the plane of the two vibration direction of the boom 300, there will be components of vibration in a third axis perpendicular to the first two directions. Accordingly, a three axis damper such as shown in FIG. 2 may be used.

In FIG. 3c, the boom 300 is shown mounted on a flexible device 320 which is fixed to the member such as a space craft at cross hatched area 302. Now it is seen that vibration in the direction of the length of the boom 300 will occur and accordingly, a three axis tuned mass damper 325, such as shown in FIG. 25, will be used. In this case the damper 325 may be mounted on the end of boom 300 like damper 305 in FIG. 3a.

It is seen that we have provided a multiple axis damper which will effectively damp vibrations of a structure to which it is attached without the addition of more than one mass and with a minimum volume used. The system design also allows greater strokes than those which use viscoelastic materials because the damping fluid doesn't limit motion as does viscoelastic material.

Although the present invention has been described with reference to preferred embodiments, workers skilled in the art will recognize that changes may be made in form and detail without departing from the spirit and scope of the invention. For example, while housing 12 is described as connected to the structure to be damped, the mass 100 may be so connected, in which case, the housing 12 would provided the moving mass for damping. I therefore do not intend to be limited to the structures shown in describing the preferred embodiments but intend only to be limited by the appended claims.

The embodiments of the invention in which an exclusive property or right is claimed are defined as follows:

1. A tuned mass damper comprising:
    a container having at least first, second, third and fourth inside wall portions;
    a mass;
    a first pair of oppositely directed bellows containing a damping fluid and connected between said first and third wall portions respectively and said mass to permit motion of said mass along a first axis at a first predetermined frequency; and
    a second pair of oppositely directed bellows containing a damping fluid and connected between said second and fourth wall portions respectively and said
    mass to permit motion of said mass along a second axis at a second predetermined frequency, said first and second pair of bellows constituting the only connection to said mass.

2. Apparatus according to claim 1 further including:
    a first passage interconnecting said first pair of bellows to allow flow of damping fluid therebetween; and
    a second passage interconnecting said second pair of bellows to allow flow of damping fluid therebetween.

3. A tuned mass damper for absorbing vibration energy from a member which may oscillate with a first component along a first axis at a first frequency and a second component along a second axis at a second frequency, comprising:
    a container having at least first, second, third and fourth inside wall portions;
    a mass;
    a first pair of oppositely directed bellows having a first predetermined stiffness, containing a damping fluid and connected between said first and third wall portions respectively and said mass, said mass and said first predetermined stiffness being selected to permit motion of said mass which produces oscillation along the first axis at the first frequency but substantially 180 degrees out of phase with the first component and, a second pair of oppositely directed bellows having a second predetermined stiffness, containing a damping fluid and connected between said second and fourth wall portions respectively and said mass, said mass and said second predetermined stiffness being selected to permit motion of said mass which produces oscillation along the second axis at the second frequency but substantially 180 degrees out of phase with the second component.

4. Apparatus according to claim 3 wherein the damping fluid in the first pair of bellows has a viscosity chosen to provide proper damping of the mass along the first axis and the damping fluid in the second pair of bellows has a viscosity chosen to provide proper damping of the mass along the second axis.

5. Apparatus according to claim 3 further including first spring means connected in series with the first pair of bellows to provide the first frequency oscillation for the mass along the first axis and second spring means connected in series with the second pair of bellows to provide the second frequency oscillation of the mass along the second axis.

6. Apparatus according to claim 3 further including first spring means connected in series with the first pair of bellows to lower the first frequency for the mass along the first axis and second spring means connected in series with the second pair of bellows to lower the second frequency of the mass along the second axis.

7. Apparatus according to claim 3 wherein the member may oscillate with a third component along third axis at a third frequency, said container has fifth and sixth wall portions and including a third pair of bellows having a third predetermined stiffness, containing a damping fluid and connected between said fifth and sixth wall portions respectively and said mass, said mass and said third predetermined stiffness being selected to permit motion of said mass which produces oscillation along said third axis at the third predetermined frequency but substantially 180 degrees out of phase with the third component, said third pair of bellows together with said first and second pair of bellows constituting the only support for said mass.

8. Apparatus according to claim 7 further including a third passage interconnecting the third pair of bellows to allow flow of damping fluid therebetween.

9. Apparatus according to claim 8 wherein the damping fluid in the first pair of bellows has a viscosity chosen to provide proper damping of the mass along the first axis, the damping fluid in the second pair of bellows has a viscosity chosen to provide proper damping of the mass along the second axis and the damping fluid in the third pair of bellows has a viscosity chosen to provide proper damping of the mass along the third axis.

10. A tuned mass damper for absorbing vibration energy from a member which may oscillate with a first component along first axis at a first frequency and a second component along a second axis at a second frequency comprising:

a housing having an inner wall;

a mass;

first, second, third and fourth bellows each having a predetermined spring force and providing a closed container of fluid, said first and second bellows having a first bellows end connected to said mass and a second bellows end connected to said inner wall, said third and fourth bellows having a first bellows end connected to said mass and a second bellows end connected to said inner wall, said first, second, third and fourth bellows operable to provide the sole connection to said mass between said mass and said housing, said mass and the spring force of said first and second bellows being selected to permit motion of said mass which produces oscillation along said first axis at the first predetermined frequency but substantially 180 degrees out of phase with the first component, said mass and the spring force of said third and fourth bellows being selected to permit motion of said mass which produces oscillation along said second axis at the second predetermined frequency but substantially 180 degrees out of phase with the second component.

11. Apparatus according to claim 10 further including:

first, second, third and fourth supplemental springs, one each connected to the second end of said bellows and to said inner wall to provide a supplemental spring force with the predetermined spring force to change the frequency of oscillation between said mass and said container.

12. Apparatus according to claim 11 further including cup shaped members having first cup ends connected to the second ends of said first, second, third and fourth bellows, said cup shaped members extending around said first, second, third and fourth bellows to a second cup end towards said mass and said first, second, third and fourth supplemental springs being connected to the second cup ends respectively to provide the supplemental spring force in series with the predetermined spring force to lower the frequency of oscillations.

13. Apparatus according to claim 10 further including first and second supplemental springs connected between said mass and said inner wall to provide the supplemental spring force in parallel with the predetermined spring force to raise the frequency of oscillations.

14. Apparatus according to claim 10 further including an aperture in said mass interconnecting the closed containers of said first and second bellows to allow fluid flow therebetween.

15. A tuned mass damper for use with a member which may oscillate at a first frequency and a first phase along a first axis and at a second frequency and a second phase along a second axis comprising:

a container connected to said member and having at least first, second, third and fourth inside wall portions;

a mass;

a first pair of oppositely directed bellows containing a damping fluid and connected between said first and third wall portions respectively and said mass to permit motion of said mass along the first axis when said member oscillates along the first axis, the damping fluid in the first pair of bellows and the stiffness of the first pair of bellows chosen to cooperate with the mass to produce the first frequency of oscillation along the first axis and of phase opposite the first phase to damp the motion of the member in the first axis; and a second pair of oppositely directed bellows containing a damping fluid and connected between said second and fourth wall portions respectively and said mass to permit motion of said mass along the second axis when said member oscillates along the second axis, the damping fluid in the second pair of bellows and the stiffness of the second pair of bellows chosen to cooperate with the mass to produce the second frequency of oscillation along the second axis and of phase opposite the second phase to damp the motion of the member in the second axis.

16. Apparatus according to claim 15 further including:

a first passage interconnecting said first pair of bellows to allow flow of damping fluid therebetween; and a second passage interconnecting said second pair of bellows to allow flow of damping fluid therebetween.

17. Apparatus according to claim 15 wherein the member may oscillate at a third frequency and a third phase along a third axis, said container having fifth and sixth wall portions and including a third pair of bellows containing a damping fluid and connected between the fifth and sixth wall portions respectively and said mass to permit motion of said mass along the third axis when said member oscillates along the third axis the damping fluid in the third pair of bellows and the stiffness of the third pair of bellows chosen to cooperate with the mass to produce the third frequency of oscillation along the third axis and of phase opposite the third phase to damp the motion of the member in the third axis.

18. A tuned mass damping system for use with a member which may be disturbed so as to produce a first vibration component in a first direction at a first frequency and a first phase and a second vibration component in a second direction at a second frequency and a second phase, comprising:

a mass;

a support;

a first expandable device having a first stiffness connected between the support and the mass;

a second expandable device having a second stiffness connected between the support and the mass, the first and second expandable devices permitting the mass to provide a first motion in the first direction, the first and second stiffnesses being chosen to cooperate with the mass to cause the first motion to be at the first frequency but of phase opposite the first phase so as to absorb energy from the first vibration component;

a third expandable device having a third stiffness connected between the support and the mass;

a fourth expandable device having a fourth stiffness connected between the support and the mass, the third and fourth expandable devices permitting the mass to provide a second motion in the second direction, the third and fourth stiffnesses being chosen to cooperate with the mass to cause the second motion to be at the second frequency but of phase opposite the second phase so as to absorb energy from the second vibration component.

* * * * *